(12) United States Patent
Ban et al.

(10) Patent No.: US 7,644,597 B2
(45) Date of Patent: Jan. 12, 2010

(54) APPARATUS AND METHOD FOR MANUFACTURING PLATE GLASS

(75) Inventors: Nobuyuki Ban, Yokohama (JP); Toru Kamihori, Yokohama (JP); Atsushi Inoue, Yokohama (JP); Motoichi Iga, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 551 days.

(21) Appl. No.: 11/543,785

(22) Filed: Oct. 6, 2006

(65) Prior Publication Data
US 2007/0022783 A1    Feb. 1, 2007

Related U.S. Application Data

(63) Continuation of application No. PCT/JP2005/006683, filed on Apr. 5, 2005.

(30) Foreign Application Priority Data

| Apr. 7, 2004 | (JP) | ............................. 2004-113543 |
| Dec. 15, 2004 | (JP) | ............................. 2004-362735 |

(51) Int. Cl.
   C03B 18/00    (2006.01)
   C03B 18/16    (2006.01)
(52) U.S. Cl. ...................... 65/182.3; 65/157; 65/99.2
(58) Field of Classification Search ............. 65/182.3, 65/99.2, 99.4, 157
   See application file for complete search history.

(56) References Cited

U.S. PATENT DOCUMENTS 3,241,939 A * 3/1966 Michalik .................... 65/99.6

(Continued)

FOREIGN PATENT DOCUMENTS

GB    2 189 014 A    10/1987

(Continued)

OTHER PUBLICATIONS

English language machine translaton of JP 11-310421 A.*

(Continued)

*Primary Examiner*—Steven P. Griffin
*Assistant Examiner*—Jason L. Lazorcik
(74) *Attorney, Agent, or Firm*—Oblon, Spivak, McClelland, Maier & Neustadt, L.L.P.

(57) ABSTRACT

An apparatus 10 for producing a plate glass, comprising a bath 14 for float-forming for reserving a molten metal 16 for forming a band-shaped plate glass having a predetermined thickness by feeding a molten glass ribbon 20 in a predetermined direction on the molten metal 16, and a pair of partition walls 46 provided substantially above left and right edges 22 of the molten glass ribbon 20 and substantially along the edges 22 to partition a space above a bath surface of the molten metal into an upper space A above a region covered with the molten glass ribbon 20 and upper spaces B above regions not covered with the molten glass ribbon 20; wherein the partition walls 46 each has a vertically dividable structure dividable into an upper partition wall 46A and a lower partition wall 46B, and the lower partition wall 46B is constituted by strip-shaped lower strip members 58 provided continuously to each other in a lateral direction, and the strip members 58 are configured to be removable or openable from the upper partition wall 46A.

7 Claims, 8 Drawing Sheets

U.S. PATENT DOCUMENTS

| | | | | |
|---|---|---|---|---|
| 3,248,197 | A | * | 4/1966 | Michalik et al. ............ 65/182.3 |
| 3,337,318 | A | * | 8/1967 | Gulotta ....................... 65/25.3 |
| 3,432,283 | A | * | 3/1969 | Galey .......................... 65/99.6 |
| 3,462,253 | A | * | 8/1969 | Sensi ........................... 65/99.4 |
| 3,615,315 | A | * | 10/1971 | Michalik et al. ............. 65/25.3 |
| 3,885,944 | A | * | 5/1975 | Stingelin .................... 65/99.6 |

FOREIGN PATENT DOCUMENTS

| | | | |
|---|---|---|---|
| JP | 50-3414 A | | 1/1975 |
| JP | 11-21137 | | 1/1999 |
| JP | 11021137 A | * | 1/1999 |
| JP | 11-310421 A | | 11/1999 |

OTHER PUBLICATIONS

English language machine translation of JP11-021137 A.*

\* cited by examiner

APPARATUS AND METHOD FOR MANUFACTURING PLATE GLASS

TECHNICAL FIELD

The present invention relates to an apparatus for producing a plate glass using a float method, which is an apparatus and a method for forming and producing a plate glass, comprising a partition wall for partitioning an upper space above a bath surface into an upper space above a region covered with a molten glass ribbon and upper spaces above regions not covered with the molten glass ribbon, in particular, to a structure above a float-forming bath in the manufacturing apparatus for plate glass.

BACKGROUND ART

An apparatus for producing a plate glass using a float method, is an apparatus for producing a band-shaped plate glass having a predetermined plate thickness, by supplying a molten glass on a molten tin (molten metal) reserved in a bath to form a molten glass ribbon, and pulling the molten glass ribbon towards a layer (gradual cooling apparatus) disposed continuously from an exit of the bath.

Heretofore, in the production of plate glass using the float method, an upper space above the bath surface is filled with a reducing gas (reducing property is obtained mainly by hydrogen gas and nitrogen gas) to prevent oxidation, since oxide of molten tin tends to adhere to a back surface of a plate glass or oxide or compound of tin evaporated from a bath surface of the molten tin tends to adhere to a front surface of the plate glass, or the adhered matter tends to form a defect of a product or causes to form a defect such as scratch at a time of conveying the plate glass. The gas is supplied to a ceiling portion of the bath by a reducing gas supply pipe, and the gas is further supplied to an upper space above the bath surface of the molten tin through a brick wall (roof brick) of the bath. The supplied gas is exhausted mainly through an exit of the bath or an exhaust port provided to exhaust a gas, to the outside of the bath.

However, there is a case where tin, tin oxide or tin compound evaporated from the bath surface of molten tin, adheres to the front surface of molten glass ribbon, and as a measure for this problem, Patent Document 1 proposes to provide a partition wall for partitioning an upper space above a bath surface of molten tin into an upper space above a region covered with the molten glass ribbon and an upper space not covered with the molten glass ribbon. Further, in order to prevent deterioration of heaters provided in the bath by a reducing gas, the document proposes to provide 100% nitrogen gas to the upper space above the region covered with the molten glass ribbon partitioned from the upper space by the partition wall, and proposes to supply a nitrogen gas containing 10% of hydrogen gas to the upper space above the region not covered with the molten glass ribbon.

Patent Document 1: JP-A-11-310421

DISCLOSURE OF THE INVENTION

Problems to be Solved by the Invention

However, a conventional partition wall has an effect of preventing tin, tin oxide or tin compounds evaporated from a bath surface of molten tin from adhering to a surface of molten glass or preventing deterioration of heaters, but since the molten glass ribbon is concealed from a worker, there is a demerit that it is difficult for the worker to handle a trouble occurred inside of the partition wall.

Further, since there is a case where a top roll holds edges of a molten glass ribbon to maintain the width of molten glass ribbon to be a predetermined width, and the top roll is inserted from a side wall of the bath for this purpose, it is necessary to maintain a distance between a lower end of the partition wall and a bath surface of molten tin so as to dispose the top roll. Accordingly, there is a demerit that partitioning effect of the partitioning of the upper space above the bath surface of molten tin into the upper space above the region covered with the molten glass ribbon and the upper space above the region not covered with the molten glass ribbon, is decreased.

The present invention has been made considering the above-mentioned circumstances, and it is an object of the present invention to provide an apparatus and a method for producing a plate glass, which employs a partition wall not disturbing a work of a worker and adapted to the use of a top roll.

Means for Solving the Problems

The present invention provides, to achieve the above object, an apparatus for producing a plate glass comprising a bath for float-forming for reserving a molten metal for forming a band-shaped plate glass having a predetermined thickness by feeding a molten glass ribbon in a predetermined direction on the molten metal, and a pair of partition walls provided substantially above left and right edges of the molten glass ribbon and substantially along the edges to partition a space above a bath surface of the molten metal into an upper space above a region covered with the molten glass ribbon and upper spaces above regions not covered with the molten glass ribbon; wherein the pair of partition walls each has a vertically dividable structure dividable into an upper partition wall and a lower partition wall, and among the upper partition wall and the lower partition wall, at least the lower partition wall is constituted by strip-shaped lower strip members provided continuously to each other in a lateral direction, and the strip members in at least a region are configured to be removable or openable from the upper partition wall.

Here, the term "left and right edges of the molten glass ribbon" means both ends of the molten glass ribbon in its width direction.

According to the above apparatus of producing a plate glass, since it is possible to remove or open/close lower strip members from the upper partition wall as the case requires, the worker can observe the inside of the partition wall. Accordingly, when a trouble occurs inside the partition wall, a worker can easily handle the problem. Further, since the lower part of the partition wall is constituted by a large number of lower strip members provided continuously to each other in a lateral direction, the worker can remove a desired lower strip member from the upper partition wall.

In a preferred embodiment of the present invention, the pair of partition walls are provided at positions inside by a predetermined distance from left and right edges of the molten glass ribbon respectively.

The predetermined distance at the time of disposing the pair of partition walls at positions more inside by a predetermined distance from left and right edges of the molten glass ribbon respectively, is preferably within a range of from 0 to 400 mm.

In a preferred embodiment of the present invention, the upper partition wall is also constituted by strip-shaped upper strip members provided continuously to each other in a lateral direction. The reason is that since the partition wall is exposed to high temperature in the bath, if the upper partition wall is constituted by a single plate, the upper partition wall tends to have a crack or breakage by a thermal stress, and by constituting the upper partition wall by the upper strip members provided continuously to each other in a lateral direction, the cracks or breakage can be prevented.

In a preferred embodiment of the present invention, the lower strip members are provided continuously to each other by a fitting structure. By this construction, sealing effect of the partition wall can be improved, and it is possible to more efficiently prevent air inside of the partition wall and air outside of the partition wall from mixing with each other.

In a preferred embodiment of the present invention, the lower strip members are each made of a carbon member whose surface is provided with a SiC film. The reason of this construction is that since the lower strip members close to a bath reserving a molten metal, are always in an environment where the members are exposed to high temperature and easily oxidized, it is preferred to prevent oxidization by providing the SiC film on the surface of the lower strip members.

In a preferred embodiment of the present invention, the removable structure is a structure that the lower strip member is hung from the upper partition wall by engaging a first engage portion formed in the vicinity of a lower end of the upper partition wall with a second engage portion formed in the vicinity of an upper end of the lower strip member. By this construction, the lower strip member is easily attached and removed from the upper partition wall, and since the attaching and removing structure is simple, production of the lower strip member is easy. For example, a protrusion (a first engage portion) is formed on one of the upper partition wall and the lower strip member and a hole (the second engage portion) corresponding to the protrusion is formed on the other one of them, so that the lower strip member is hung from the upper partition wall by inserting the protrusion into the hole. Or else, a lower end of the upper partition wall and an upper end of the lower strip member may be bend into hook forms so as to engage with each other to hang the lower strip member from the upper partition wall.

In a preferred embodiment of the present invention, a hook to be engaged with an attaching-removing stick to be used for attaching and removing the lower strip member, is formed in the lower strip member. By this construction, the worker can easily attach or remove the lower strip member from the outside of the bath by using the removing-attaching stick.

Further, the present invention provides a method for producing a plate glass, characterized in that a plate glass is produced by using the above-mentioned apparatus for producing a plate glass.

Effects of the Invention

According to the apparatus for producing a plate glass using a float method according to the present invention, even if a partition wall is present, it is possible to simplify a work of a worker and it is possible to adapt to the use of a top roll.

EXPLANATION OF NUMERALS

10: apparatus for producing a plate glass, 12: gutter-like body, 14: bath, 16: molten tin, 18: supply port, 20: molten glass ribbon, 22: edge, 24: bath surface, 26: concave portion, 28: upper opening, 30: vertical flowing path, 32: lower opening, 34: horizontal flowing path, 40: linear motor, 42: ceiling structure, 44: ceiling wall, 46: partition wall, 46A: upper partition wall, 46B: lower partition wall, 47: partition wall, 48: casing, 50: first partition wall, 52: gas supply pipe, 54: heater, 56: exhaust pipe, 57: second partition wall, 58: lower strip member, 60: upper strip member, 62: protrusion, 64: hole, 66: hook, 68: attaching-removing stick

BEST MODE FOR CARRYING OUT THE INVENTION

Preferred embodiments of the apparatus for producing a plate glass using a float method according to the present invention, are described with reference to attached drawings.

Figure 1:
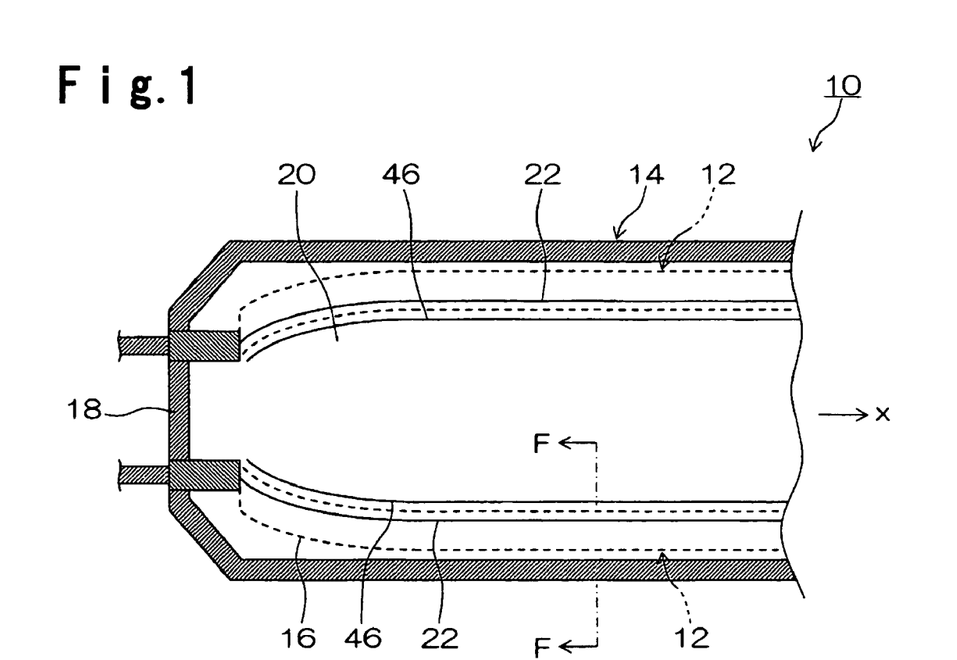
FIG. 1: A plan view of an apparatus for producing a plate glass of the present invention.

FIG. 1 shows a plan view of an apparatus 10 for producing a plate glass using a float method (hereinafter referred to as float plate glass producing apparatus 10). A plate glass for a flat panel display (FPD) such as for e.g. a liquid crystal display, is commonly required to have a plate thickness of about 0.7 mm and high precision of flatness. As an apparatus for producing such a plate glass, a float plate glass production apparatus 10 which holds edges 22 with no contact using gutter-like bodies 12, is suitably used, and according to the float plate glass producing apparatus 10, a plate glass satisfying a plate thickness and a flatness required for a plate glass for PFD, can be produced.

Figure 2:
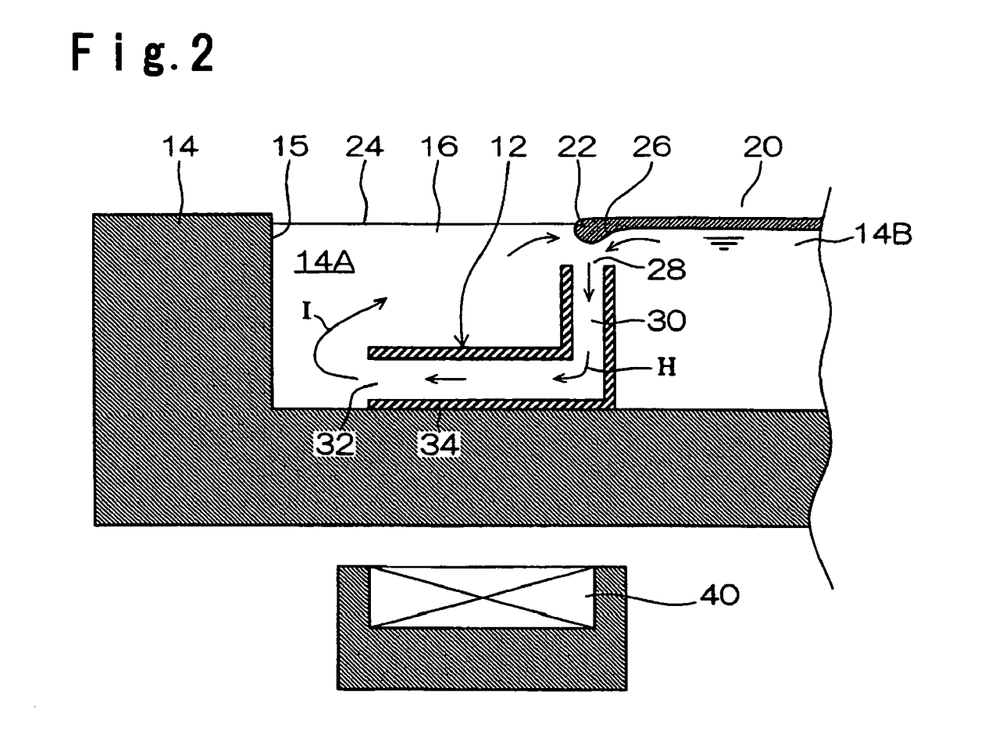
FIG. 2: A cross-sectional view of a gutter-like body observed from a line F-F of FIG. 1.

The gutter-like bodies 12 of the float plate glass producing apparatus 10, are disposed underneath a molten glass ribbon 20 in a bath 14 shown in FIG. 2, and disposed so as to be immersed in a molten tin (molten metal) 16 reserved in the bath 14, and disposed along both edges 22, 22 of the molten glass ribbon 20 continually supplied to a supply port 18 shown in FIG. 1 in the bath 14 from a molten glass furnace. Further, the molten glass ribbon 20 moves on a surface of the molten tin as the molten glass ribbon is pulled towards a layer in X direction in FIG. 1, and in a high-temperature zone (about 930 to 1,300° C. in a case of soda lime glass) and in a forming zone (about 800 to 930° C. in the case of soda lime glass) of the molten glass ribbon 20 in the bath 14, the edges 22, 22 are each held in a concave portion 26 of the bath surface 24 (FIG. 2). Further, the plate thickness of the molten glass ribbon 20 whose edges 22, 22 are held by the concave portions 26, is adjusted by a pulling speed of the molten glass ribbon 20, and thereafter, the molten glass ribbon 20 is sent to a later stage of the bath under a stable condition, cooled, and taken out from the bath and sent to the above-mentioned layer. Here, the glass of this example is a soda lime glass, and the molten tin 16 in the high temperature zone, is heated by an electric heater. Here, the bath 14 is made of heat-resistant bricks.

FIG. 2 is a F-F cross-sectional view of FIG. 1. As shown in these figures, the gutter-like bodies 12 are each formed to have a substantially L-shaped cross-section, and constituted by a vertical flow path 30 for which an upper opening 28 is formed, and a horizontal flow path 34 for which a lower opening 32 is formed. Further, underneath the horizontal flow path 34 of the gutter-like body 12 at the bottom of the bath 14, a linear motor is provided, and by the linear motor 40, a driving force is provided to molten tin 16 in the horizontal flow path 34, and the molten tin 16 flows in a direction shown by an arrow H in the vertical flow path 30 and the horizontal flow path 34 in the gutter-like body 12. By this movement, since there occurs a flow of the molten tin 16 towards the bottom of the bath 14 that is substantially perpendicular to the bath surface 24, a negative pressure is generated underneath the edge 22 of the molten glass ribbon 20, and by the negative pressure, fluid level of the molten tin 16 in the vicinity of the edge 22 becomes lower than the fluid level of the molten tin in other portions. Accordingly, the edge 22 of the molten glass ribbon 20 flows into the concave portion 26 of the bath surface 24 thus lowered. Accordingly, since the edges 22 of the molten glass ribbon 20 are held in the concave portions, it is possible to increase the width of the molten glass ribbon (to prevent the molten glass ribbon from shrinking in its width direction), and to maintain the state of large width, whereby a plate glass having a thickness thinner than a balanced thickness, is produced.

The linear motor 40 has a merit that it can directly drive the molten tin 16 and easily control the flow rate. The linear motor 40 generates magnetic field moving in a predetermined direction by using a coil formed around a comb-tooth-shaped primary iron core and applying three-phase AC voltage to the coil to sequentially magnetize the coil. The linear motor 40 is disposed underneath the bottom of the bath 14 below the gutter-like body 12, and disposed at a position from which a driving force can be provided to the molten tin 16 in the horizontal flow path 34 in the gutter-like body 12. Accordingly, the molten tin 16 in the vertical flow path 30 and the horizontal flow path 34 is driven from underneath of the edge 22 of the molten glass ribbon 20 towards a side wall 15 of the bath 14 as shown by an arrow H by the driving force of the linear motor 40, and its moving direction is changed as shown by an arrow I. Further, by a suction force generated at the upper opening 28 of the vertical flow path 30, the molten tin 16 in the bath periphery 14A and the molten tin 16 in the bath center 14B are flown towards the upper opening 28, and sucked into the upper opening 28. Accordingly, a stable concave portion 26 is formed in the bath face 24, and the edge 22 is stably held by the concave portion 26.

Figure 3:
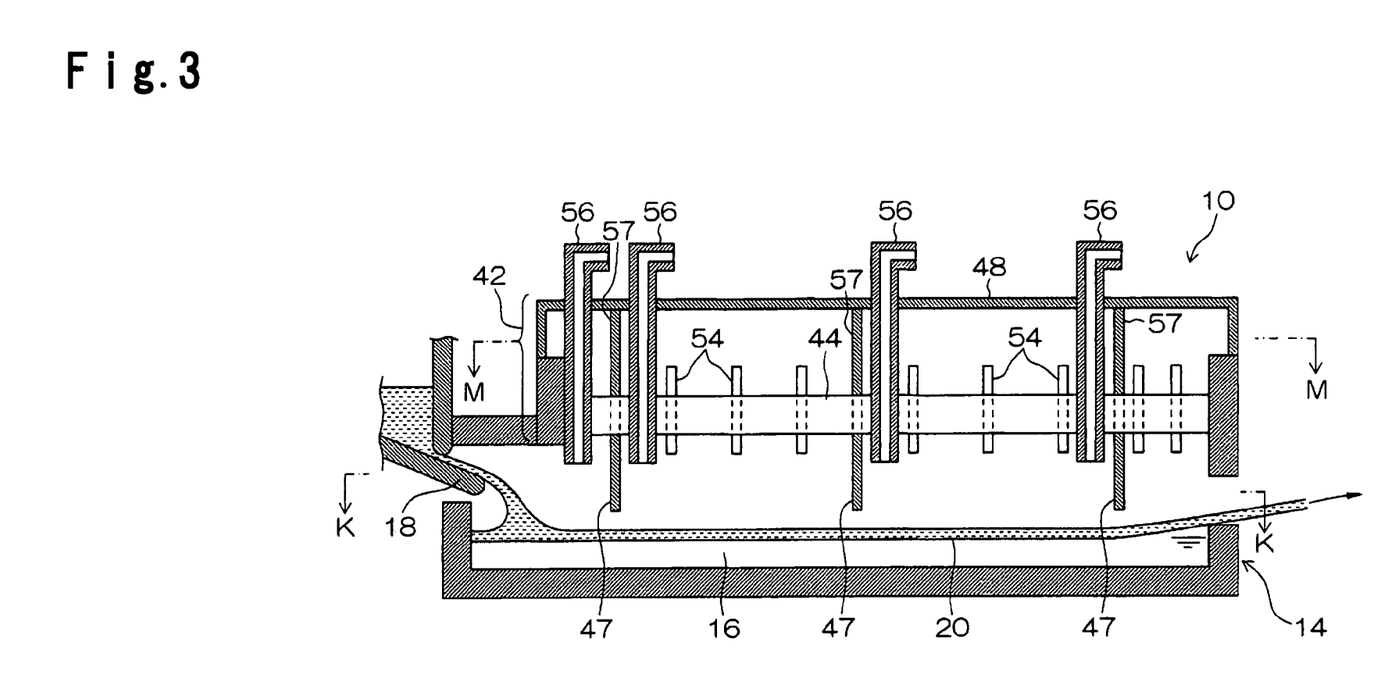
FIG. 3: A cross-sectional view showing a longitudinal cross-section of the apparatus for producing a plate glass of the present invention.
Figure 4:
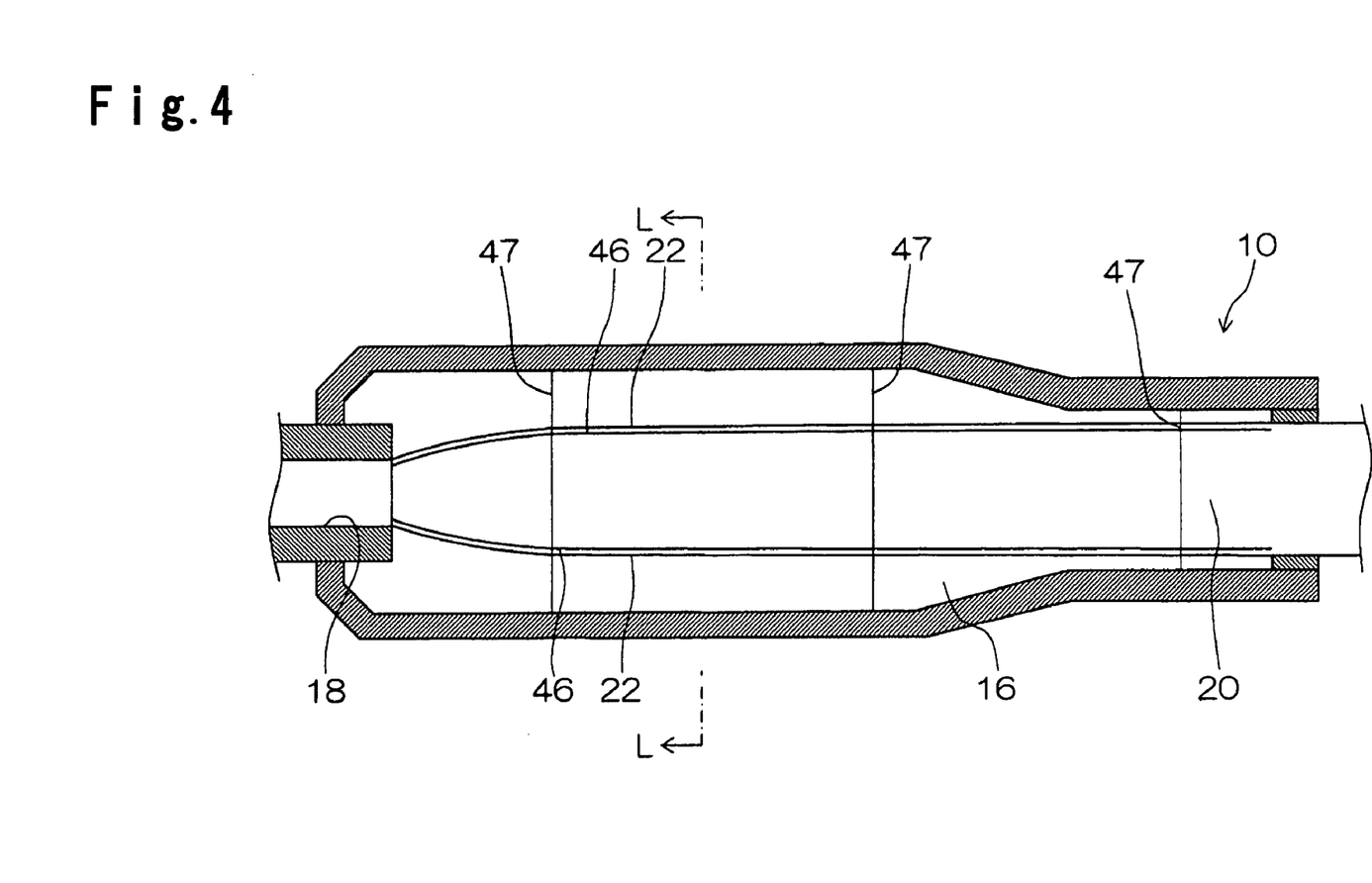
FIG. 4: A K-K cross-sectional view of FIG. 3.
Figure 5:
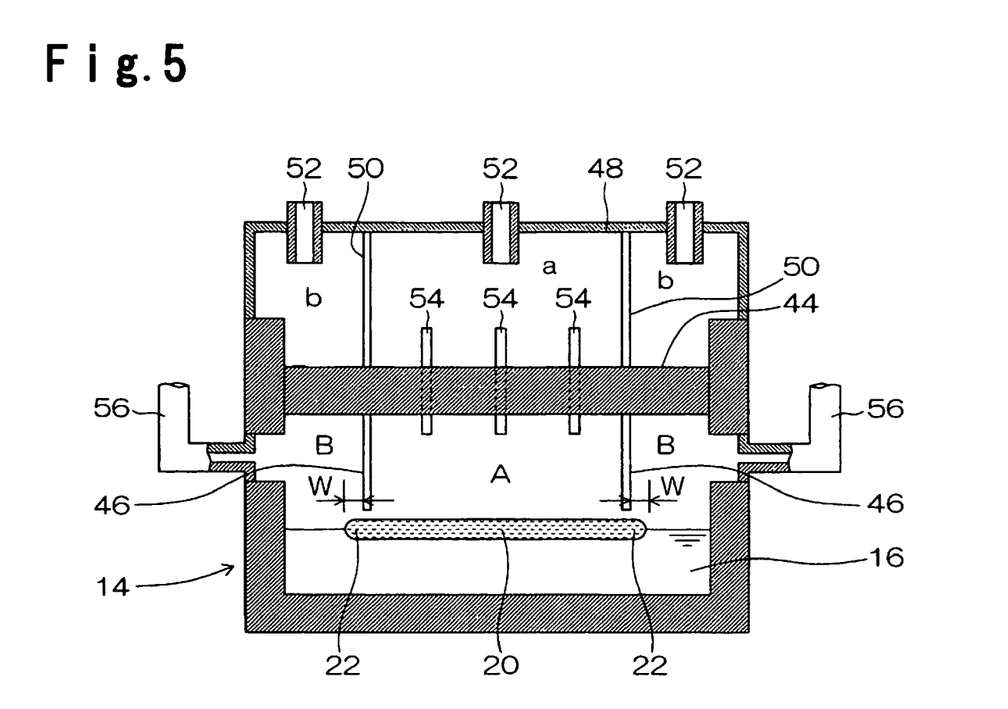
FIG. 5: A L-L cross-sectional view of FIG. 4.
Figure 6:
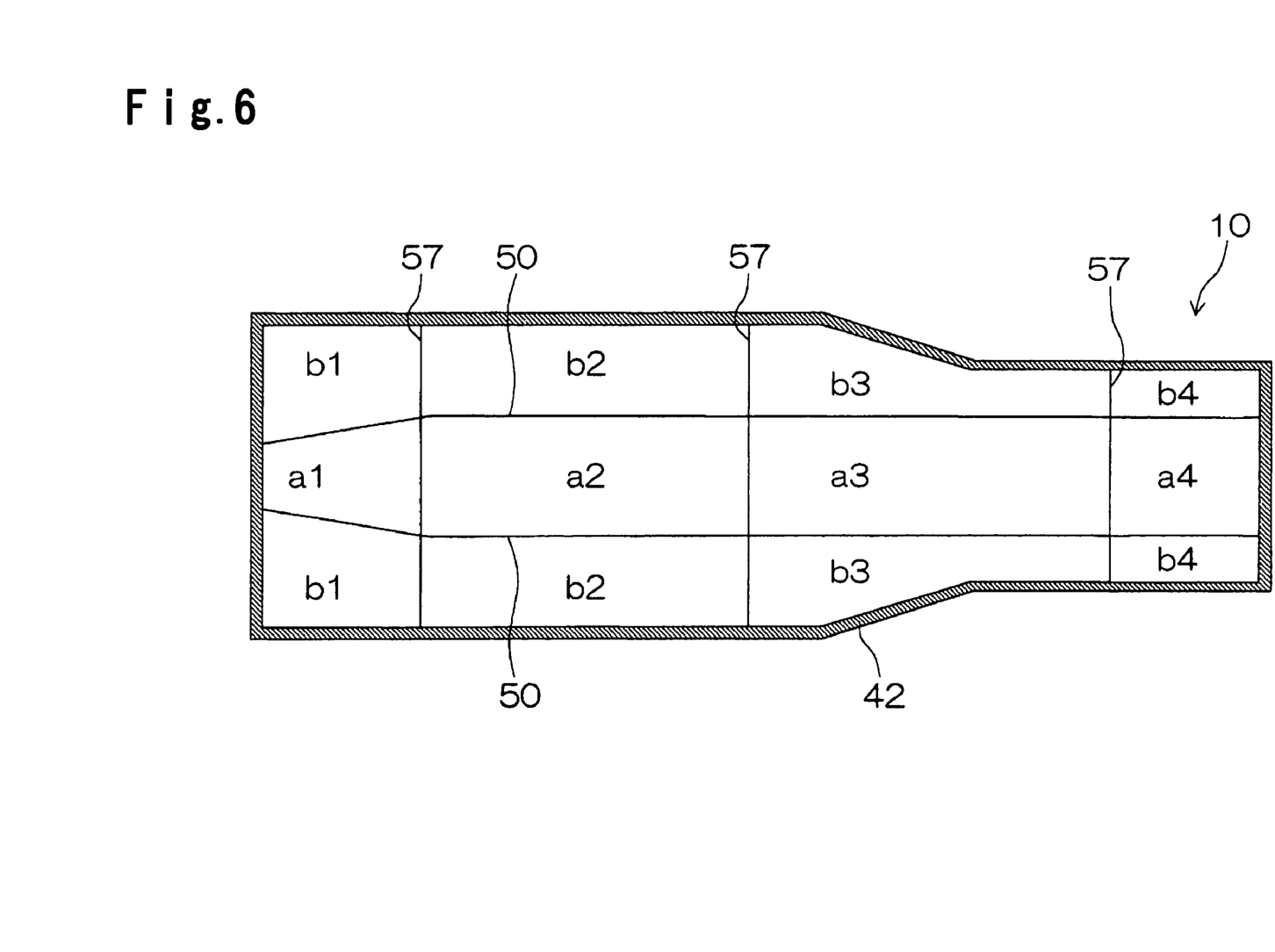
FIG. 6: A M-M cross-sectional view of FIG. 3.

Then, using FIGS. 3 to 9, a ceiling structure of the bath 14 and the partition walls 46 are described. FIG. 3 is a cross-sectional view showing a cross-section in a longitudinal direction of the production apparatus, and FIG. 4 is a K-K cross-sectional view of FIG. 3, FIG. 5 is a L-L cross-sectional view of FIG. 4, and FIG. 6 is a M-M cross-sectional view of FIG. 3.

As shown in these figures, the ceiling structure 42 (roof) of the bath 14 is partitioned from an upper space above the molten tin 16 so as to be permeable, by a brick wall (roof brick) constituting a ceiling wall 44. As understandable from FIGS. 4 and 5, the upper space above the molten tin 16 is partitioned by a pair of partition walls 46 provided vertically substantially above the edges 22, 22 of the molten glass ribbon 20, into an upper space above a region covered with the molten glass ribbon 20 and upper spaces B above regions not covered with the molten glass ribbon 20. The partition walls 46 each has an upper end reaching the ceiling wall 44 to maintain sealing effect, while its lower end extends to a position where a gap is formed between the position and an upper surface of the molten glass ribbon 20. The size of the gap is usually within a range of from 10 to 300 mm. Further, the partition walls 46 disposed in the vicinity of the respective edges 22 of the molten glass ribbon 20, partition the upper space into an upper space above the region covered with the molten glass ribbon 20 and upper spaces above regions not covered with the molten glass ribbon 20. Here, it is preferred that the partition walls 46 partition the upper space into the upper space A and the upper spaces B at positions inside by a predetermined distance (W) from the positions of the edges 22. In this case, the predetermined distance is preferably within a range of from 0 to 400 mm, more preferably from 50 to 200 mm.

The ceiling structure 42 is mainly constituted by the ceiling wall 44 and a casing 48 provided so as to have a space from the ceiling wall 44, and the space is partitioned by first partition walls 50 disposed longitudinally and corresponding to the respective partition walls 46, to form a space (a) corresponding to the space A and spaces (b) corresponding to the spaces B. A gas supply pipe 52 is provided to the casing 48, an inert gas is supplied to the space (a), and a reducing gas is supplied to the spaces (b). These gases are supplied through a gap between ceiling walls 44 or a gap between the ceiling wall 44 and the heater 54, to the space A or the spaces B above the molten tin 16. In this case, as shown in FIG. 6, it is more preferred to partition a space in the ceiling structure 42 by a plurality of second partition walls 57 (three partition walls are shown in FIG. 6) disposed in a width direction for partitioning the space. Further, it is preferred that partition walls 47 corresponding to the partition walls 57 are provided in an upper space above the molten glass ribbon 20. The partition walls 47 each has its upper end reaching the ceiling wall 44 to maintain sealing effect, while its lower end extends to a position where a gap is formed between the position and an upper surface of the molten glass ribbon 20. The size of the gap is usually within a range of from 10 to 300 mm, and its lower position is preferably approximately the same as the lower positions of the partition walls 46 corresponding to the partition walls 50. By the second partition walls 57, the above-mentioned space (a) in the ceiling structure 42 is partitioned into compartments a1, a2, a3 and a4, and the above-mentioned space (b) in the ceiling structure is partitioned into compartments b1, b2, b3 and b4. Further, to each of the compartments a1, a2, a3 and a4, a gas of 100% nitrogen as an inert gas is supplied at the respective flow rates, and to each of the compartments b1, b2, b3 and b4, a mixed gas of hydrogen gas as a reducing gas and nitrogen gas, is supplied with respective composition and flow rate. Accordingly, the flow rate of the inert gas supplied to the upper space A above the region of the bath surface 24 of the molten tin 16 covered with the molten glass ribbon 20, and the composition and the flow rate of reducing gas supplied to the upper spaces B above the regions not covered with the molten glass ribbon 20, can be appropriately adjusted according to the process stage of the molten glass ribbon 20, by the second partition walls 57 and the partition walls 47.

In the supply of the inert gas and the reducing gas to the spaces A and B, the partition walls 46 each has, as described above, only a small gap between its lower and the molten glass ribbon 20, and accordingly, it is possible to substantially prevent gases in the space A and spaces B from mixing with each other. However, there is a demerit that since the molten glass ribbon 20 is concealed by the partition wall 46 from a worker operating the production apparatus 10, it is difficult for the worker to handle a trouble if the trouble occurs inside the partition wall 46.

Figure 7:
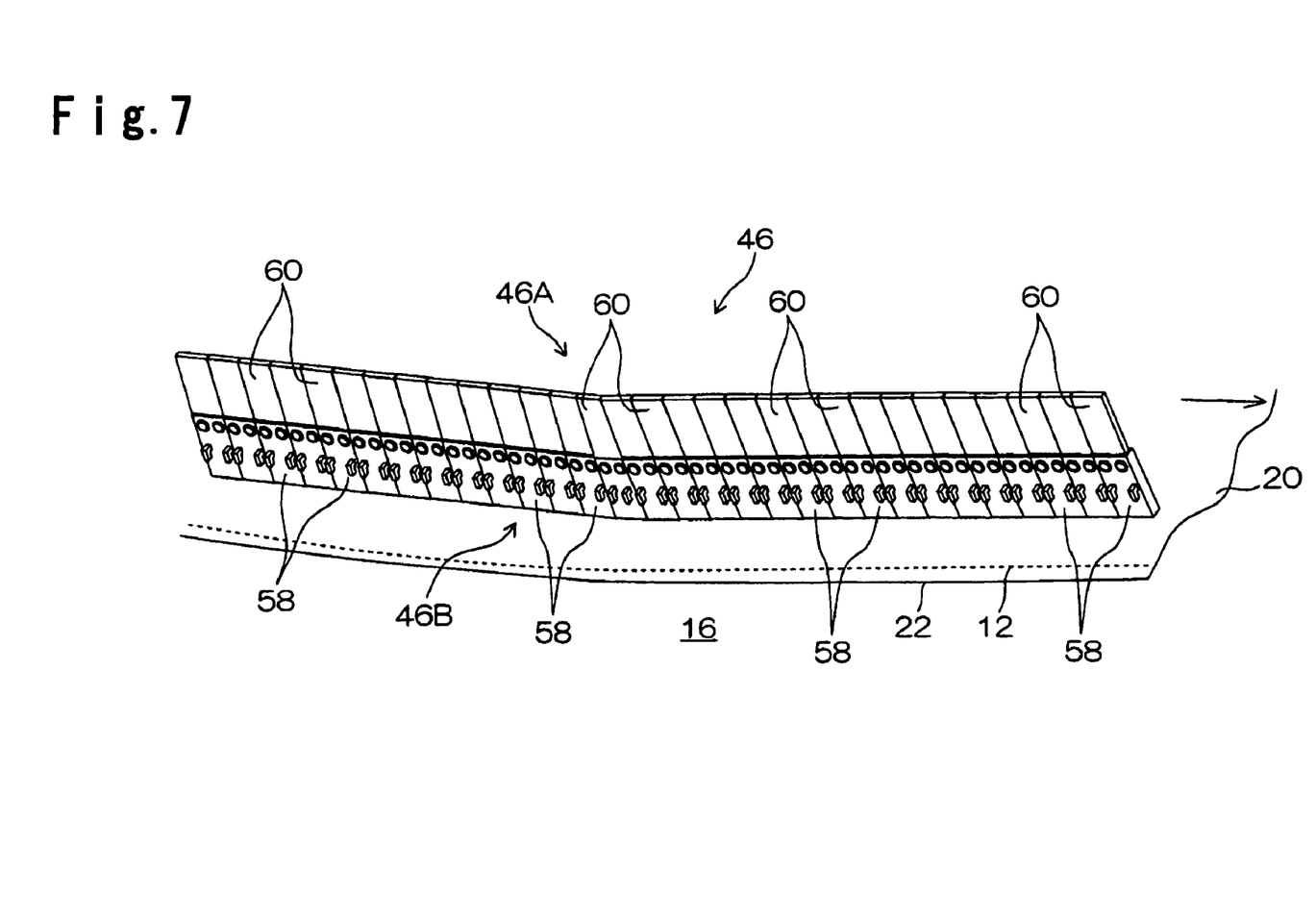
FIG. 7: An explanation view illustrating a partition wall.

To cope with this problem, in the present invention, as shown in FIG. 7 and FIG. 8, the partition walls 46 each has a construction that it can be separated into an upper partition wall 46A and a lower partition wall 46B, and at least the lower partition wall 46B among the upper partition wall 46A and the lower partition wall 46B, is constituted by strip-shaped lower strip members 58 provided continuously to each other in a lateral direction (corresponding to a moving direction of the molten glass ribbon), and the lower strip members 58 are configured to be removable from the upper partition wall 46A.

In this example, the upper partition wall 46A is, in the same manner as the lower partition wall 46B, constituted by strip-shaped upper strip members 60 provided continuously in a lateral direction. This is because since the partition wall 46 is exposed to a high temperature in the spaces A and B, cracks or breakage tends to occur in the upper partition wall 46A by a thermal stress if the upper partition wall 46A is a single plate. However, by constituting the upper partition wall 46A by the upper strip members 60 provided continuously to each other in the lateral direction, the cracks and breakages can be prevented. Further, in this example, the width of an upper strip member 60 and a lower strip member 58 are made to be the same, but since the upper partition wall 46A is used as it is fixed, those widths are not necessarily the same. Namely, the upper strip member 60 may have a wide width within a range that no crack or breakage occurs in the upper strip member 60 by the thermal stress.

Further, it is sufficient that the thicknesses of the lower strip member 58 and the upper strip member 60 are at least 1 mm, preferably from 5 to 300 mm. Further, the upper partition wall 46A is used as it is fixed and requires a semi-permanent lifetime, and thus, a brick of e.g. sillimanite is suitably used for the upper strip member 60. On the other hand, the lower partition wall 46B is required to have shock resistance, oxidation resistance and workability since it is constituted by the lower strip members 58 used as they are attached and removed and since hole 64 or hooks 66 are integrally formed with the lower strip members 58 as described later. Accordingly, besides a brick, a carbon material excellent in shock resistance and workability is also suitably used for the lower strip members 58.

Further, for the lower strip members 58, a sintered product of SiC or a molded product of boron nitride can also be used. However, considering e;g. handling property, thermal shock resistance, moldability and cost, carbon material is particularly preferred.

Since the lower strip members 58 are always exposed to high temperature, an antioxidation film is preferably provided on the surface. The antioxidation film is provided by coating a ceramic coating material such as silica, alumina, zirconia or silicon carbide by spraying or brushing. However, in a case where the coating is uneven, the antioxidation film becomes to be easily peeled off by the difference of thermal expansion coefficients between the film and the lower strip member 58. Further, the antioxidation film may be peeled off by e.g. a shock. Accordingly, it is preferred that the antioxidation film is coated on the lower strip member 58 with uniform coating thickness.

Meanwhile, an antioxidation film of SiC can be formed also by sputtering (e.g. CVD method or CVI method). In this case, since the thickness becomes substantially constant, peeling of the antioxidation film by the difference of thermal expansion coefficients between the film and the lower strip member 58, unlikely occurs. Further, since SiC is physically strong, peeling of the antioxidation film by e.g. a shock also unlikely occurs. The film thickness of SiC is preferably from 1 to 1,000 μm. If the film is too thin, it becomes to be easily peeled off by e.g. a shock, and if it is too thick, the difference of thermal expansion coefficients between the film and the lower strip member 58 increases and the film becomes to be easily peeled off. The film thickness is more preferably from 10 to 500 μm, further preferably from 50 to 200 μm, particularly preferably from 80 to 120 μm.

Figure 8A:
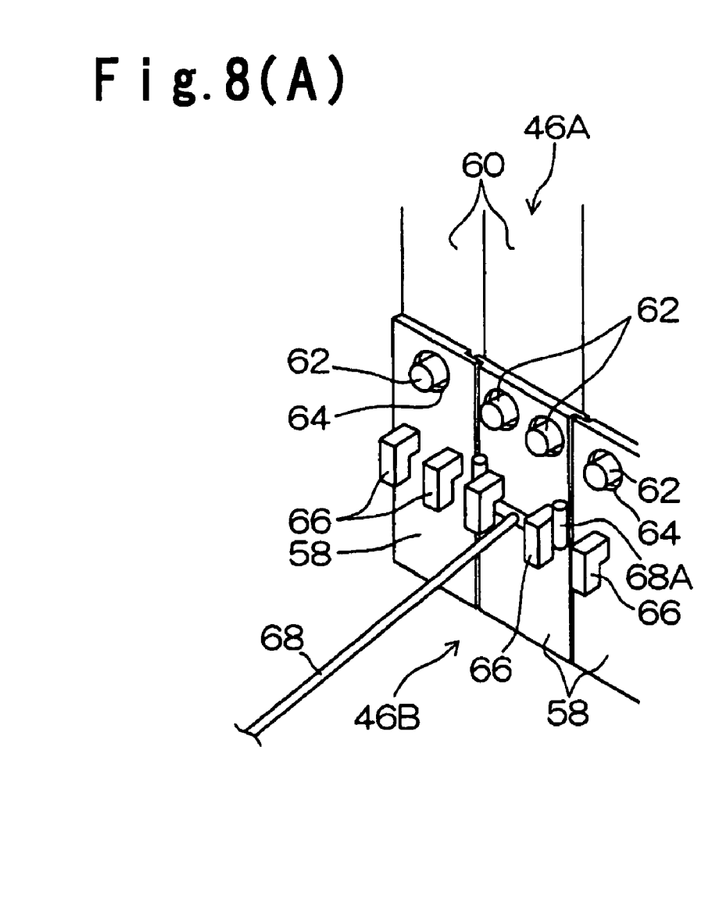
FIG. 8: An explanation view illustrating attaching and removing of a lower strip member constituting a lower partition wall of a partition wall.
Figure 8B:
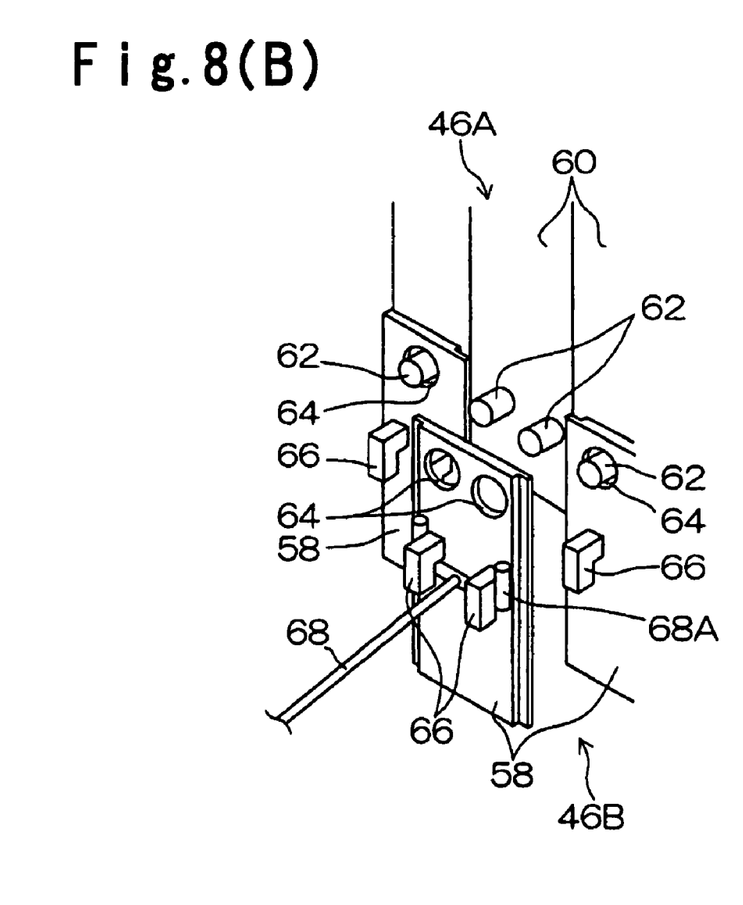

As shown in FIG. 8, a pair of protrusions 62, 62 in left and right sides are formed in the vicinity of lower end of an upper strip member 60, and a pair of holes 64, 64 in left and right sides are formed in the vicinity of upper end of a lower strip member 58 so as to correspond to the protrusions 62. Then, by inserting the protrusions 62 of the upper strip member 60 into the holes 64 of the lower strip member 58, the lower strip member 58 is hung from the upper strip member. In this case, the holes 64 may be formed in the upper strip member 60 and protrusions 62 may be formed in the lower strip member 58. Further, in substantially the central portion of the outer face (a surface in the space B side) of the lower strip member 58, a pair of hooks 66, 66 in left and right sides are formed to point downwardly. On the other hand, at a leading edge of an attaching-removing stick to be used by a worker (not shown), an U-shaped engage portion 68A to be engaged with the pair of hooks 66, 66 of the lower strip member 58, is formed. Accordingly, the worker can insert the attaching-removing stick 68 through a monitoring hole, not shown, of the bath 14, and as shown in FIG. 8(A), engage the engage portion 68A at the leading edge of the attaching-removing stick 68 with a pair of hooks 66, 66 of the lower strip member 58 and pull the stick towards the worker, whereby the worker can remove the lower strip member 58 from the upper strip member 60 as shown in FIG. 8(B).

Accordingly, since the worker can observe inside of the partition wall 46 through a window formed by removing the lower strip member 58, the worker can easily handle a problem even if the problem occurs inside of the partition wall 46. Further, since the lower partition wall 46B is constituted by a large number of lower strip members 58 provided continuously to each other in a lateral direction, the worker can remove a desired lower strip member 58 from the upper strip member 60.

Further, in this example, gutter-like bodies 12 are used in a high temperature zone (an upstream side of the bath 14) and a forming zone (downstream side of the high temperature zone) of the bath 14, to hold edges 22 of the molten glass ribbon 20. However, in a case where a trouble occurs in e.g. the gutter-like body 12 and the edges 22, 22 of the molten glass ribbon 20 need to be held by using a top roll, if the partition wall 46 is constituted in the manner of the present invention, it is possible to dispose the top roll by removing a lower strip member 58 at a position to be used for the top roll, whereby usefulness of the production apparatus 10 improves.

Figure 9A:
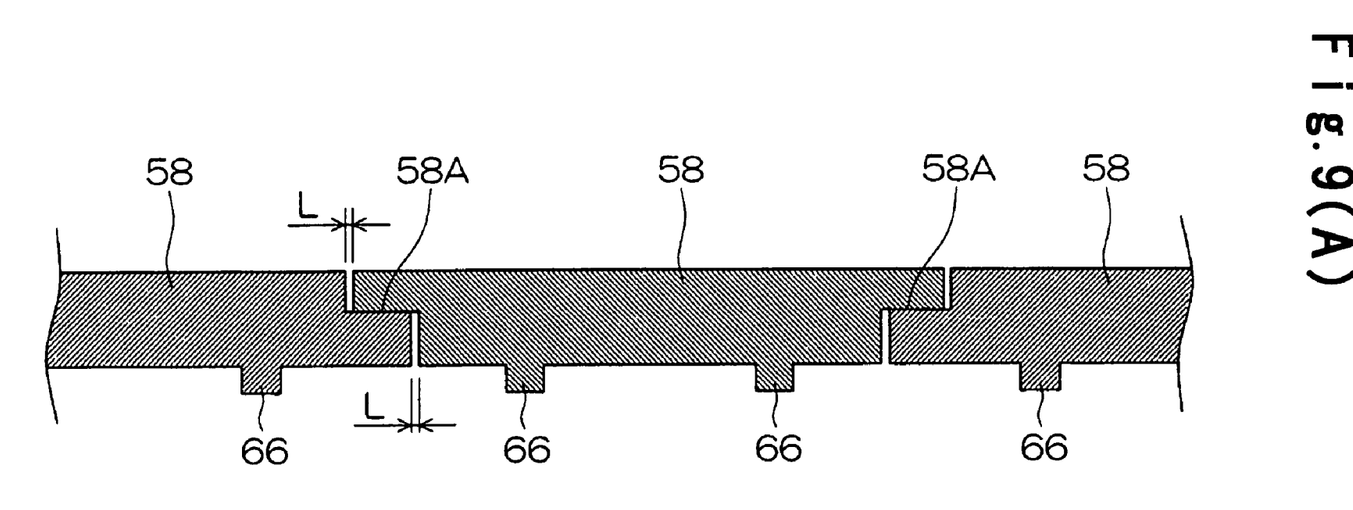
FIG. 9: An explanation view illustrating a structure of lower strip members provided continuously to each other.
Figure 9B:
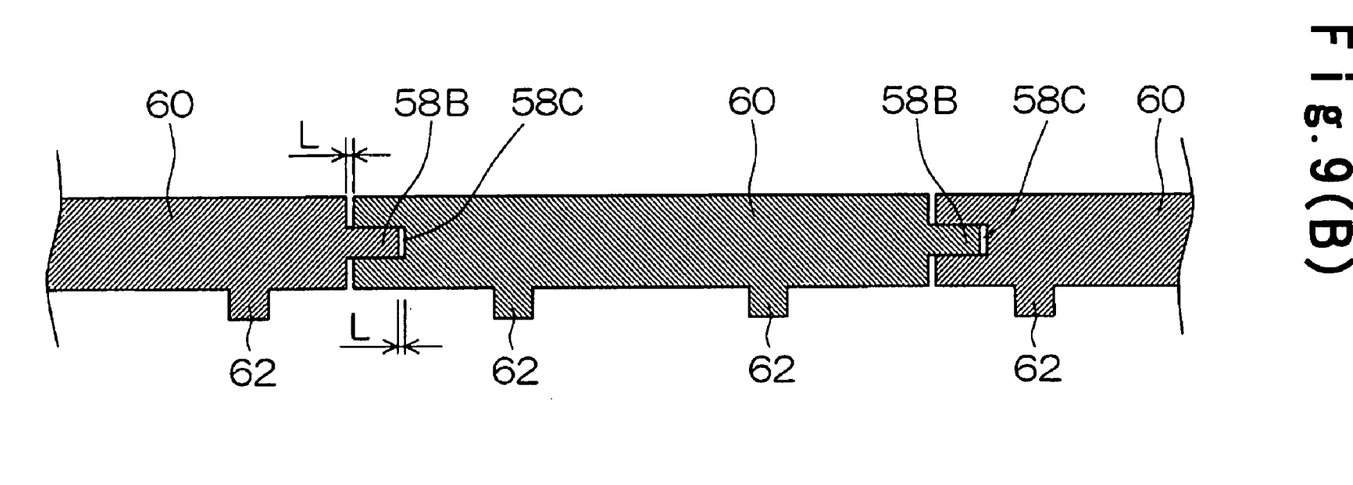

Further, as shown in FIGS. 9(A) and 9(B), as a structure for providing the lower strip members 58 or upper strip members 60 continuously to each other in a lateral direction, a fitting structure such as an interlock structure or a labyrinth structure, is suitably employed.

The interlock structure shown in FIG. 9(A), is a method of forming a step face 58A by forming a L-shaped notch on each side of a lower strip member 58 and meeting the step faces 58A of adjacent lower strip members 58. Further, the labyrinth structure shown in FIG. 9(B), is a method of forming a protrusion 58B on one of the side ends of an upper strip member 60 and forming a groove 58C on the other side end of the upper strip member 60, and fitting a protrusion 58B and a groove 58C of adjacent respective upper strip members 60. Thus, by forming the continuous structure of the lower strip members 58 or the upper strip members 60 by using the interlock structure or the labyrinth structure, sealing effect is maintained even if the lower strip members 58 or the upper strip members 60 are provided continuously to each other in a lateral direction to form the upper partition wall 46A or the lower partition wall 46B. Accordingly, it is possible to further prevent gases in the space A and the spaces B from mixing to each other. When the interlock structure and the labyrinth structure are compared, considering workability at a time of removing, the lower strip members 58 preferably have the interlock structure shown in FIG. 9(A).

In this case, in each case of the interlock structure and the labyrinth structure, it is preferred to provide adjacent lower strip members 58 or upper strip members 60 continuously so that a small gap L is formed between these members. The lower strip members 58 are exposed to high temperature in the bath 14 and thermally expand, but by forming the above gap L, it is possible to prevent breakage of the lower strip members 58 by the expansion.

Here, in this example, the structure is such that the lower strip members 58 are removable from the upper partition wall 46A, but the structure may be such that each lower strip member 58 is connected to the upper partition wall 46A via e.g. a hinge structure so as to be openable so that inside of the partition wall 46 can be observed by opening the lower strip member 58.

INDUSTRIAL APPLICABILITY

The present invention can be applied to production of a thin plate glass having little waviness and high flatness using a float method.

The entire disclosures of Japanese Patent Application No. 2004-113543 filed on Apr. 7, 2004 and Japanese Patent Application No. 2004-362735 filed on Dec. 15, 2004 including specifications, claims, drawings and summaries are incorporated herein by reference in their entireties.

What is claimed is:

1. An apparatus for producing a plate glass, comprising:
    a bath for float-forming for reserving a molten metal for forming a band-shaped plate glass having a predetermined thickness by feeding a molten glass ribbon in a predetermined direction on the molten metal; and
    a partition wall provided substantially above each of left and right edges of the molten glass ribbon and substantially along the edges to partition a space above a bath surface of the molten metal into an upper space above a region covered with the molten glass ribbon and upper spaces above regions not covered with the molten glass ribbon,
    wherein each of the partition walls is vertically divided into an upper partition wall and a lower partition wall,
    wherein among the upper partition wall and the lower partition wall, at least the lower partition wall is constituted by strip-shaped lower strip members provided continuously to each other in a lateral direction, and
    wherein the strip members in at least a region are configured to be removed or opened from the upper partition wall.

2. The apparatus for producing a plate glass according to claim 1 wherein the partition walls are provided at positions inside by a predetermined distance from left and right edges of the molten glass ribbon respectively.

3. The apparatus for producing a plate glass according to claim 1, wherein the upper partition wall is also constituted by strip-shaped upper strip members provided continuously to each other in a lateral direction.

4. The apparatus for producing a plate glass according to claim 1, wherein the lower strip members are provided continuously to each other by a fitting structure.

5. The apparatus for producing a plate glass according to claim 1, wherein the lower strip members are each made of a carbon member whose surface is provided with a SiC film.

6. The apparatus for producing a plate glass according to claim 1, wherein the lower strip member is hung from the upper partition wall by engaging a first engage portion formed in the vicinity of a lower end of the upper partition wall with a second engage portion formed in the vicinity of an upper end of the lower strip member.

7. The apparatus for producing a plate glass according to claim 6, wherein a hook to be engaged with an attaching-removing stick to be used for attaching and removing the lower strip member, is formed in the lower strip member.

\* \* \* \* \*